(12) United States Patent
Downton

(10) Patent No.: US 7,941,906 B2
(45) Date of Patent: May 17, 2011

(54) PROGRESSIVE CAVITY APPARATUS WITH TRANSDUCER AND METHODS OF FORMING AND USE

(75) Inventor: Geoff Downton, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 595 days.

(21) Appl. No.: 11/967,941

(22) Filed: Dec. 31, 2007

(65) Prior Publication Data
US 2009/0169364 A1    Jul. 2, 2009

(51) Int. Cl.
B23Q 17/00    (2006.01)
F01B 25/26    (2006.01)

(52) U.S. Cl. .................................. 29/407.05

(58) Field of Classification Search .......... 29/407.05, 29/407.01, 888.023, 527.3, 527.2; 415/118, 415/182, 200, 15, 45; 322/2 R; 164/47, 164/131; 73/862.191
See application file for complete search history.

(56) References Cited

U.S. PATENT DOCUMENTS

| 1,892,217 | A | 12/1932 | Moineau |
| 3,084,631 | A | 4/1963 | Bourke |
| 4,718,824 | A * | 1/1988 | Cholet et al. ............... 417/14 |
| 6,543,132 | B1 | 4/2003 | Krueger et al. |
| 6,568,076 | B2 | 5/2003 | Bottos et al. |
| 7,739,792 | B2 * | 6/2010 | Lee et al. ............. 29/888.023 |

FOREIGN PATENT DOCUMENTS

WO    WO2004/036043    4/2004

* cited by examiner

*Primary Examiner* — John C Hong
(74) *Attorney, Agent, or Firm* — Jeremy Welch; Brigitte Echols

(57) ABSTRACT

The present invention relates to a stator (100-1000) with a profiled helical bore (106,206,306,606,706,806,906,1006) having a cast material layer (102;202;302;602;702;802;902; 1002) with transducers (104A-104D;304;604A-604D;710; 804;904A-904C;1010) disposed therein and describes the methods of forming such stators. Cast material can be fluidic during displacing of a transducer therein. Cast material layer 202 can include housings (218,222) disposed therein and/or a cavity 226 formed therein. Transducer can be a sensor (104A-104C) and/or an actuator 104D. Transducer 804 can extend axially along a length of the stator 800. Transducer or plurality of transducers (904A-904C) can extend along a helical path. Additionally or alternatively, sleeve 1008 can include a transducer 1010.

13 Claims, 9 Drawing Sheets

PROGRESSIVE CAVITY APPARATUS WITH TRANSDUCER AND METHODS OF FORMING AND USE

BACKGROUND

The invention relates generally to stators for use with progressive cavity pumps or motors; more specifically, to a stator having at least one transducer therein and methods of forming and using the stator.

Progressive cavity pumps or motors, also referred to as a progressing cavity pumps or motors, typically include a power section consisting of a rotor with a profiled helical outer surface disposed within a stator with a profiled helical bore. The rotor and stator of a progressive cavity apparatus operate according to the Moineau principle, originally disclosed in U.S. Pat. No. 1,892,217, herein incorporated by reference.

In use as a pump, relative rotation is provided between the stator and rotor by any means known in the art, and a portion of the profiled helical outer surface of the rotor engages the profiled helical bore of the stator to form a sealed chamber or cavity. As the rotor turns eccentrically within the stator, the cavity progresses axially to move any fluid present in the cavity.

In use as a motor, a fluid source is provided to the cavities formed between the rotor and stator. The pressure of the fluid causes the cavity to progress and imparts relative rotation between the stator and rotor. In this manner fluidic energy can be converted into mechanical energy.

As progressive cavity pumps or motors rely on a seal between the stator and rotor surfaces, one of or both of these surfaces can include a resilient or dimensionally forgiving material. Typically, the resilient material has been a relatively thin layer of elastomer disposed in the interior surface of the stator. A stator with a thin elastomeric layer is typically referred to as thin wall or even wall design.

An elastomeric lined stator with a uniform or even thickness elastomeric layer has previously been disclosed in U.S. Pat. No. 3,084,631 on "Helical Gear Pump with Stator Compression". The prior art has evolved around the principle of injecting an elastomer into a relatively narrow void between a stator body with a profiled helical bore and a core (e.g., mandrel) with a profiled helical outer surface. The core is then removed after curing of the elastomer and the remaining assembly forms an elastomeric lined stator. The elastomer layer is essentially the last component formed.

The stator bodies mentioned above have a pre-formed profiled helical bore. The profiled helical bore is generally manufactured by methods such as rolling, swaging, or spray forming, as described in U.S. Pat. No. 6,543,132 on "Methods of Making Mud Motors", incorporated by reference herein. Similarly, a profiled helical bore can be formed by metal extrusion, as described in U.S. Pat. No. 6,568,076 on "Internally Profiled Stator Tube", incorporated by reference herein. Further, various hot or cold metal forming techniques, such as pilgering, flow forming, or hydraulic forming, as described in P.C.T. Pub. No. WO 2004/036043 A1 on "Stators of a Moineau-Pump", incorporated by reference herein, can be used to form a stator body with a profiled helical bore.

A stator body can also be formed by creating a profiled helical bore in relatively thin metal tubing. This formed metal tube can then be used as the stator body by itself, with an injected inner elastomeric layer, or the formed metal tube can be inserted inside into a second body with a longitudinal bore to form the stator body. A stator body with a profiled helical bore can also be formed through other process such as sintering or hot isostatic pressing of powdered materials, for example, a metal, or the profiled helical bore can be machined directly into a body.

It is also desirable to include transducers, including sensors and actuators, in the stator body. The current methods of producing the stator body require complicated machining, etc. of the stator body material, which is typically steel, and therefore are not conducive to providing additional machining for inclusion of the transducers on the finished product. As will be more fully discussed herein, the inclusion of transducers can also aid in the fabrication of stators in a number of ways.

Referring to the particular embodiment of a progressive cavity downhole motor used in drilling operations (e.g., mud motor), the space available for sensing and measuring devices of downhole conditions is limited. The operational portion of a typical bottom hole assembly, including the motors can be relatively long, up to about 9 meters (30 feet) or more. By utilizing the stator of the progressive cavity motor, which heretofore has not contained any sensing or measuring devices, as a carrier of electronics such as transducers then valuable additional space may be claimed for more sophisticated drilling bottom hole assemblies.

Motors are preferably installed as proximal to the drill bit as possible; yet space adjacent the bit is particularly valuable because of its proximity to the newly drilled formation. Transducers, such as a sensor, measuring relevant down hole data as close to the newly drilled formation as possible allows better and more timely well placement decisions to be made, i.e., to control the direction of drilling.

Further, motors undergo significant stress and strain, particularly the load paths through the resilient material layer (e.g., the seal) as it effectively reacts to the bit torque and any forces from downhole transmissions and bearings. For example, some motors can deliver hundreds of kilowatts of power for 200 hours or more at elevated temperatures of about 150° C. (300° F.) or more.

Monitoring the status of the stator and/or the formation and new borehole, such as the temperature, strain and pressure, can allow an assessment of current performance capabilities, e.g., how much power can be generated before the motor might fail, how long is the motor expected to last, and other questions of similar importance to expensive drilling programs.

The disposition of conduits, conductors, and/or pathways which can be used for communicating in electrical, hydraulic and/or mechanical form was previously disclosed in the prior art and are well known to those in this art. See for example U.S. Patent and Trademark Ser. No. 11/496,562, which is incorporated by reference herein.

SUMMARY OF THE INVENTION

A method of forming a stator with a profiled helical bore can include providing a core with a profiled helical outer surface, displacing the core within a longitudinal bore of a body, filling a void between the profiled helical outer surface of the core and the longitudinal bore of the body with a cast material in a fluid state, disposing at least one transducer in the cast material, and curing the cast material. The disposing step can occur when the cast material is in the fluid state. The method can include removing the core from the cured cast material. The core includes a resilient material sleeve disposed thereon. The method can include removing the core from the resilient material sleeve, wherein the resilient material sleeve is retained within the cured cast material. The method can include providing a signal from a temperature sensor in the cast material. The method can include monitoring the curing step via the signal. The method can include controlling the curing step based on the signal.

A method of detecting discontinuity in a stator having a cast material body with a profiled helical bore therein can include heating the stator, providing a signal from at least one temperature sensor disposed in the cast material body, and comparing the signal to a prototypic signal to determine any discontinuity.

A method of assembling a rotor and a stator of a progressive cavity apparatus can include providing the stator with a cast material body having a profiled helical bore therein, inserting the rotor into the profiled helical bore, providing a signal from at least one strain sensor disposed in the cast material body, and comparing the signal to a prototypic signal corresponding to a desired fit between the stator and the rotor to determine any undesirable fit.

A method of assembling a rotor and a stator of a progressive cavity apparatus can include providing the stator with a cast material body with a profiled helical bore therein, inserting the rotor into the profiled helical bore, providing a signal from at least one pressure sensor disposed in the cast material body and in communication with the profiled helical bore, and comparing the signal to a prototypic signal corresponding to a desired fit between the stator and the rotor to determine any undesirable fit.

A method of assembling a rotor and a stator of a progressive cavity apparatus can include providing the stator with a cast material body with a profiled helical bore therein, inserting the rotor into the profiled helical bore, providing a pressure signal from at least one pressure sensor in communication with the profiled helical bore and a strain signal from at least one strain sensor disposed in the cast material body, and comparing the pressure signal to a prototypic pressure signal and comparing the strain signal to a prototypic strain signal to determine any undesirable fit, the prototypic pressure and prototypic strain signals corresponding to a desired fit between the stator and the rotor.

A method of monitoring a progressive cavity apparatus having a rotor disposed in a profiled helical bore of a stator providing at least one strain sensor disposed in a cast material body of the stator, providing a prototypic signal of the at least one strain sensor corresponding to a desired fit between the stator and the rotor, providing a subsequent signal from the at least one strain sensor, and comparing the prototypic signal to the subsequent signal to determine any deviation therebetween.

A method of monitoring a progressive cavity apparatus having a rotor disposed in a profiled helical bore of a stator can include providing at least one pressure sensor disposed in a cast material body of the stator and in communication with the profiled helical bore, providing a prototypic signal of the at least one pressure sensor corresponding to a desired fit between the stator and the rotor, providing a subsequent signal from the at least one pressure sensor, and comparing the prototypic signal to the subsequent signal to determine any deviation therebetween.

A method of monitoring a progressive cavity apparatus having a rotor disposed in a profiled helical bore of a stator can include providing at least one strain sensor and at least one pressure sensor in communication with the profiled helical bore disposed in a cast material body of the stator, providing a prototypic strain signal of the at least one strain sensor and a prototypic pressure signal of the at least one pressure sensor, the prototypic strain and prototypic pressure signals corresponding to a desired fit between the stator and the rotor, providing a subsequent strain signal from the at least one strain sensor and a subsequent pressure signal from the at least one pressure sensor, and comparing the prototypic strain signal to the subsequent strain signal and comparing the prototypic pressure signal to the subsequent pressure signal to determine any deviation therebetween.

A method of monitoring a progressive cavity apparatus having a rotor disposed in a profiled helical bore of a stator can include providing at least one of a temperature sensor, a pressure sensor in communication with the profiled helical bore, and a strain sensor disposed in a cast material body of the stator, and providing a first signal from the at least one of the temperature sensor, the pressure sensor, and the strain sensor, providing a subsequent second signal from the at least one of the temperature sensor, the pressure sensor, and the strain sensor, and comparing the first and subsequent second signals to determine any deviation therebetween. The method of monitoring a progressive cavity apparatus wherein at least one of the first and subsequent second signals are generated during rotation of the rotor in the profiled helical bore in the cast material body of the stator.

A method of monitoring a progressive cavity apparatus having a rotor disposed in a profiled helical bore of a stator can include providing a plurality of pressure sensors disposed in a cast material body of the stator and in communication with the profiled helical bore, providing a first signal from one of the pressure sensors, providing a second signal from another of the pressure sensors, and comparing the first signal to the subsequent second signal to determine any deviation therebetween. The method of monitoring further including distributing the plurality of pressure sensors in a helical path along the profiled helical bore of the stator and/or distributing the plurality of pressure sensors in a helical path along the profiled helical bore of the stator with at least one pressure sensor per pitch length.

A method of measuring a torque output of a progressive cavity apparatus having a rotor disposed in a profiled helical bore of a stator can include providing at least one pressure sensor disposed in a cast material body of the stator and in communication with the profiled helical bore, providing a prototypic signal of the at least one pressure sensor corresponding to a known torque output, providing a subsequent signal from the at least one pressure sensor, and comparing the prototypic signal to the subsequent signal to determine the torque output.

A method of measuring a torque output of a progressive cavity apparatus having a rotor disposed in a profiled helical bore of a stator can include providing at least one strain sensor disposed in a cast material body of the stator, providing a prototypic signal of the at least one strain sensor corresponding to a known torque output, providing a subsequent signal from the at least one strain sensor, and comparing the prototypic signal to the subsequent signal to determine the torque output.

A method of generating electricity in a progressive cavity apparatus having a rotor and a stator can include providing the rotor having one of a magnet and a coil of a power generating apparatus, providing the stator having the other of the magnet and the coil disposed in a cast material body thereof, and rotating the rotor within a profiled helical bore in the cast material body of the stator to generate electricity via a relative rotation between the magnet and the coil.

A method of generating electricity in a progressive cavity apparatus having a rotor disposed in a profiled helical bore of a stator can include providing a piezo electric generator disposed in the cast material body of the stator and in communication with the profiled helical bore, and disposing a fluid through the profiled helical bore of the stator, wherein the fluid generates electricity via actuation of the piezo electric generator.

A method of generating hydraulic power in a progressive cavity apparatus having a rotor and a stator can include providing the stator having a reciprocating pump disposed in a cast material body thereof, and rotating the rotor within a profiled helical bore in the cast material body of the stator, wherein the rotor engages an actuation member of the reciprocating pump extending into the profiled helical bore to generate hydraulic power.

A method of forming a stator with a profiled helical bore can include providing a core with a profiled helical outer surface, displacing the core within a longitudinal bore of a body, filling a void between the profiled helical outer surface of the core and the longitudinal bore of the body with a cast material in a fluid state, disposing at least one cavity mold in the cast material, and curing the cast material.

A method of monitoring a progressive cavity apparatus having a rotor disposed in a profiled helical bore of a stator can include providing at least one axial load sensor disposed in a cast material body of the stator, and providing a signal from the at least one axial load sensor corresponding to an axial load on the stator.

A method of monitoring a progressive cavity apparatus having a rotor disposed in a profiled helical bore of a stator can include providing at least one wire strain sensor disposed in a cast material body of the stator, and providing a signal from the at least one wire strain sensor corresponding to an axial torque on the stator. The method can include disposing a pressure compensated housing into the cast material before curing and/or disposing an atmospherically sealed housing into the cast material before curing.

A method of communicating between a stator and a rotor of a progressive cavity apparatus having a resilient material sleeve therebetween can include providing the stator having a first electrical conductor ring in a cast material body thereof, the first electrical conductor ring circumferential to a profiled helical bore of the stator, providing the rotor having an outer surface with a second electrical conductor ring adjacent thereto, and communicating between the first and the second electrical conductor rings through an intermediate ring section of the resilient material sleeve can include a conductive material disposed therein.

A method of forming a stator with a profiled helical bore can include providing a tube with the profiled helical bore therein, displacing the tube within a longitudinal bore of a body, filling a void between an outer surface of the tube and the longitudinal bore of the body with a cast material in a fluid state, disposing at least one transducer in the cast material, and curing the cast material. The method can include removing an assembly of the cast material and the tube from the longitudinal bore of the body.

A stator can include a cast material body with a profiled helical bore, and at least one transducer disposed in the cast material body. At least one transducer can be in communication with the profiled helical bore. At least one transducer can be encapsulated within the cast material body. The cast material body can be an amorphous alloy. The stator can include a resilient material sleeve disposed in the profiled helical bore. The stator can be a progressive cavity apparatus stator. The cast material body can be disposed in a longitudinal bore of a body. Any transducer disposed in the cast material body can be a sensor, and can extend along an axial length of the stator. A plurality of transducers can be distributed along an axial length of the stator and/or distributed in a helical path along the profiled helical bore of the stator. Moreover, the disposed transducer array can be a plurality of transducers distributed in a helical path along the profiled helical bore of the stator with at least one transducer per pitch length and/or along a single lobe.

The transducer can be selected from the group consisting of a pressure sensor, an electrode, a strain sensor, a temperature sensor, a coil of a power generating apparatus, a magnet of a power generating apparatus, a piezo electric generator in communication with the profiled helical bore, a reciprocating pump, an accelerometer, a shock sensor, a magnetometer, an inclinometer, a formation sensor, a resistivity sensor, a seismometer, an electromagnetic induction coil, an electromagnetic communication apparatus, a load sensor, a wire strain sensor, an optical fiber, and a magnetorheological sensor. The transducer can be a reciprocating pump with an actuation member thereof extending into the profiled helical bore. The transducer can be a formation sensor disposed adjacent an external surface of the cast material body, a wire strain sensor disposed along an axial length of the stator, and/or an optical fiber disposed along an axial length of the stator.

At least one transducer can be contained within a pressure compensated housing disposed in the cast material body and/or within an atmospherically sealed housing disposed in the cast material body. The at least one transducer can be an electrical conductor ring circumferential to the profiled helical bore.

A progressive cavity apparatus can include a stator having a first electrical conductor ring in a cast material body thereof, the first electrical conductor ring circumferential to a bore of the stator, a rotor having an outer surface with a second electrical conductor ring circumferential thereto, the rotor rotatably retained within the bore of the stator, a resilient material layer disposed between the rotor and the stator, and an intermediate ring section of the resilient material sleeve can include a conductive material therein to communicate between the first and the second electrical conductor rings.

A method of forming a stator with a profiled helical bore can include providing a core with a profiled helical outer surface, displacing the core within a longitudinal bore of a body, filling a void between the profiled helical outer surface of the core and the longitudinal bore of the body with a cast material in a fluid state, curing the cast material, removing the core to expose the profiled helical bore, and disposing a resilient material sleeve within the profiled helical bore, the resilient material sleeve having at least one transducer therein.

A method of forming a stator with a profiled helical bore can include providing a resilient material sleeve with the profiled helical bore therein, displacing the resilient material sleeve within a longitudinal bore of a body, filling a void between an outer surface of the resilient material sleeve and the longitudinal bore of the body with a cast material in a fluid state, disposing at least one transducer in the resilient material sleeve, and curing the cast material.

A method of forming a stator with a profiled helical bore can include providing a curable resilient material sleeve with at least one transducer and the profiled helical bore therein, displacing the curable resilient material sleeve within a longitudinal bore of a body, filling a void between an outer surface of the curable resilient material sleeve and the longitudinal bore of the body with a cast material in a fluid state, and curing the cast material and the curable resilient material sleeve. The method can include supporting the curable resilient material sleeve with a core having a profiled helical outer surface during at least the curing step.

A stator can include a cast material body, a resilient material sleeve disposed within the cast material body and having a profiled helical bore therein, and at least one transducer disposed in the resilient material sleeve. The transducer can alternatively be in communication with the profiled helical bore; or encapsulated within the resilient material sleeve. The cast material body can be an amorphous alloy. The stator can be a progressive cavity apparatus stator. The cast material body can be disposed in a longitudinal bore of a body. As before described, the transducer can be a sensor. The transducer can extend along an axial length of the stator. The transducer can also be a plurality of transducers distributed along an axial length of the stator and/or a plurality of transducers distributed in a helical path along the profiled helical bore of the stator. The transducer can be a plurality of transducers distributed in a helical path along the profiled helical bore of the stator with at least one transducer per pitch length.

A progressive cavity apparatus can include a rotor rotatably retained within a bore of a stator, a resilient material sleeve disposed between the rotor and the stator, and at least one transducer disposed in the resilient material sleeve.

A method of forming a resilient material sleeve of a progressive cavity apparatus, the method can include providing a sleeve mold imparting at least one of a profiled helical bore and a profiled helical outer surface, filling the sleeve mold with a resilient material in a fluid state, disposing at least one transducer into the resilient material, and curing the resilient material to form the resilient material sleeve with the at least one transducer disposed therein.

DETAILED DESCRIPTION OF THE INVENTION

Figure 1:
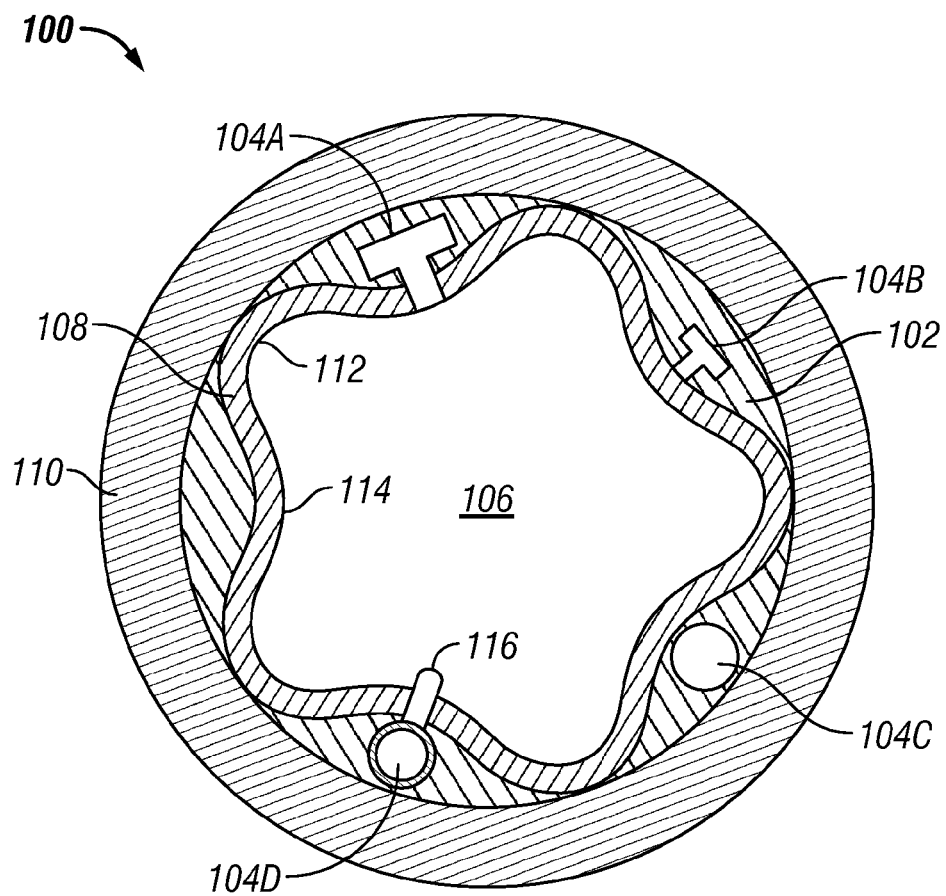
FIG. 1 is a schematic cross-sectional view of a stator having a cast material body and transducers disposed therein, according to one embodiment of the invention.

FIG. 1 is a schematic cross-sectional view of a stator 100 having a cast material body 102 and transducers 104A-104D disposed therein, according to one embodiment of the invention. Although the following is in reference to a stator of an oilfield downhole motor, it offered by way of example only. The methods and apparatuses disclosed herein are equally applicable in other industries and uses.

As used herein, the term cast material shall refer to a material poured into a mold in a molten or fluid state. Uncured cast material can be at a fluid state at about ambient atmospheric temperature and/or pressure, e.g., 21° C. (70° F.) and 101 kPa (14.7 psi), respectively.

Cast material can be any material suitable for use with a progressive cavity apparatus. For example, the cast material can be a resin or mixture of resins. One non-limiting example of a resin is the High Temperature Mould Maker (C-1) liquid epoxy by Devcon U.K., which is rated for use up to 260° C. (500° F.). Cast material can be a metal filled, ceramic filled, and/or polymeric fiber filled epoxy, e.g., those materials can be used as a matrix encapsulated in the cast material. Non-limiting examples of metal filled epoxies are those commonly known as liquid metal and are produced by ITW Devcon in the United States and Freeman Mfg. & Supply Co. in the United Kingdom, for example. Metal fillers which can be utilized are steel, aluminum, and/or titanium. One non-limiting example of a polymeric fiber filled resin is a polycarbon fiber ceramic filled Novolac™ resin by Protech Centreform (U.K.) Ltd. that remains stable up to 240° C. (460° F.). Metal fillers or other heat conducting materials can be added if desired for strength and/or to conduct heat generated in the stator bore to the outer surface of the stator tube to aid in cooling.

Another type of cast material is an amorphous alloy, which is an alloy having an amorphous atomic structure (i.e., not crystalline). Amorphous alloys retain the amorphous structure after repeated re-heating.

Cast material can be cured by the passage of time and/or thermosetting, for example. Multiple concentric layers of differing or similar cast materials can be utilized. Cast material can be selected to resist premature wear based on the fluid, which can include other particulate matter, such as the drill bit mud, used to power or be pumped through a progressive cavity apparatus. Cast material can also be selected based on expected temperature exposure requirements, for example, the downhole temperature.

In one embodiment, the cast material is molded into a desired shape, and the molding process allows a transducer to be disposed (e.g., embedded) within the cast material. More particularly, the fluidic nature of the material while the stator body is being cast allows the material to conform to whatever is disposed in the mold. This can allow the direct insertion of a transducer, housing, cavity mold, or other apparatus into the fluidic cast material, which can then be cured (e.g., solidified) into a cast material body.

Note the embodiments depicted in the drawings are not necessarily to scale. The term transducer shall refer to a device which can transform energy from one type to another, even if both energy types are in the same energy domain, e.g., mechanical, chemical or electrical. A transducer can include devices which couple energy types within a domain, e.g., an electromagnetic communication apparatus. One embodiment of an electromagnetic communication apparatus is described below in reference to FIG. 7. A transducer can be a sensor and/or an actuator. A sensor typically monitors a system and an actuator typically imposes a condition on a system. A transducer can include, but is not limited to, a pressure sensor, an electrode, a strain sensor, a temperature sensor, a coil of a power generating apparatus, a magnet of a power generating apparatus, a piezo electric generator (which can be in communication with a profiled helical bore of a stator), a reciprocating pump, an accelerometer, a shock sensor, a magnetometer, an inclinometer, a formation sensor, a resistivity sensor, a seismometer, an electromagnetic induction coil, an electromagnetic communication apparatus, a load sensor, a wire strain sensor, an optical fiber, a magnetorheological sensor, or any combination thereof. It is appreciated that a transducer, housing, cavity mold, or other apparatus can be disposed in an outer surface of the stator or cast material body portion thereof, exposed to an inner surface of the stator or cast material body portion thereof (e.g., the profiled helical bore therein), or alternatively encapsulated entirely within the cast material body. A transducer can be wireless, as is known in the art. An antenna can be disposed within the cast material body. Battery or other power storing and/or generating device can be disposed on, or encapsulated within, the cast material.

Figure 2:
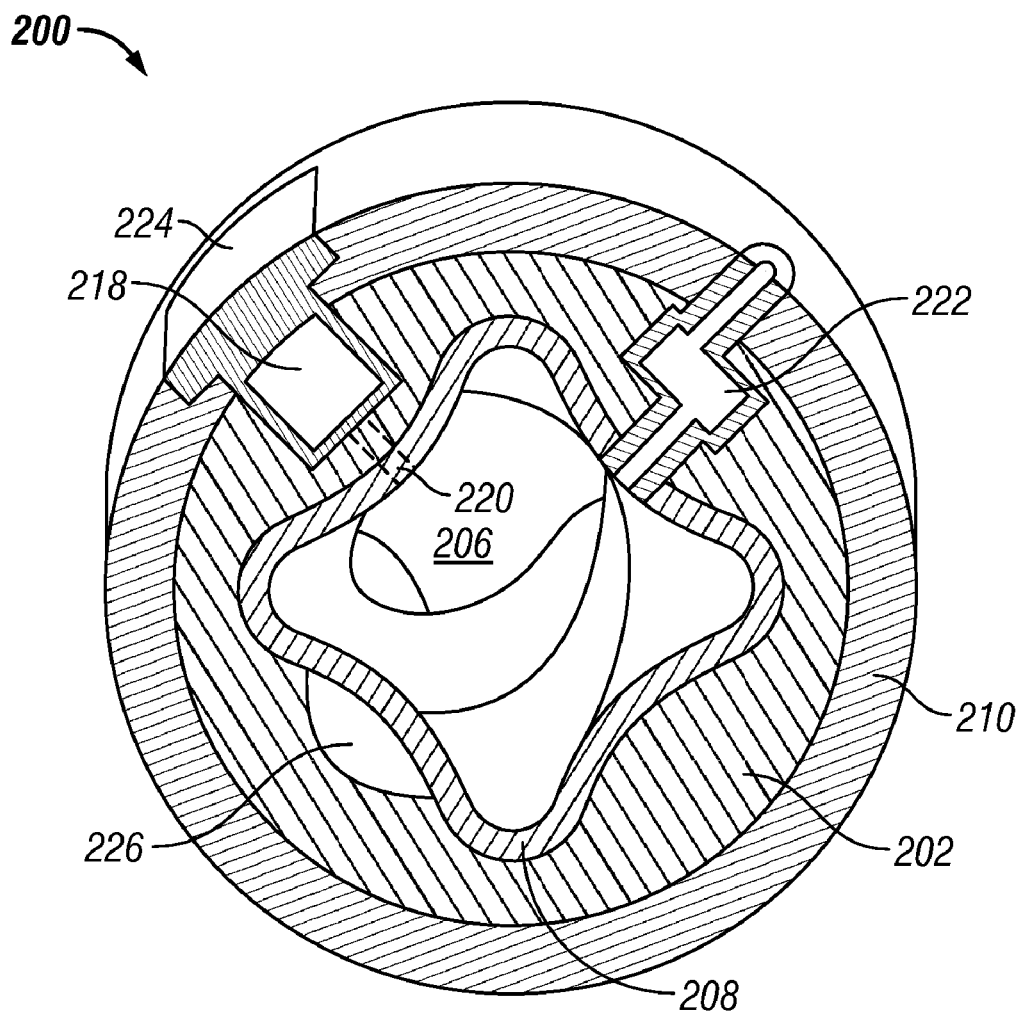
FIG. 2 is a schematic cross-sectional view of a stator having a cast material body with housings disposed therein and a cavity formed therein, according to one embodiment of the invention.

In the embodiment of FIG. 1, stator 100 has a cast material body 102 including a plurality of transducers (104A-104B) disposed therein. Stator 100 has a profiled helical bore 106 extending axially therethrough. The profiled helical form of the bore 106 can be seen more readily in FIGS. 2 and 6. FIG. 1 illustrates a five lobed profile, however a stator operating according to the Moineau principle can have as few as two lobes. For example, the embodiment in FIG. 2 illustrates a four lobed stator 200. One embodiment of the profiled helical bore of a stator can have a relatively long pitch length (the axial distance of one 360-degree helical turn of one lobe), for example, a pitch length between two to twenty times that of the major diameter of the bore.

Sleeve 108, which can be a resilient material (e.g., elastomer), and outer tube 110 depicted in FIG. 1 are each optional. The figures illustrate an even thickness sleeve and outer tube, although either or both can have variable thickness as is known in the art. For example, the apex 112 of each lobe of the sleeve 108 can have has a lesser wall thickness than the thickness at each valley 114, or vice versa. See sleeve 308 in FIG. 3 for an example.

Transducers (104A-104D) can be disposed in any location in cast material body 102. Transducer 104A is in communication with the profiled helical bore 106 and includes a port that extends through sleeve 108. Transducer 104A can be a piezo electric generator powered by the flow of fluid through the stator. Transducer 104B includes a port that terminates adjacent sleeve 108. In an embodiment where sleeve 108 is fluidicly permeable or formed of material that can transmit pressure thereacross (e.g., a highly resilient material), transducer 104B can read the pressure in bore 106. If sleeve 108 is not permeable or formed of material that cannot transmit pressure thereacross, transducer 104B can detect any leakage of a fluid from sealed bore 106, e.g., if sleeve 108 becomes perforated. Transducer 104C is fully encapsulated within cast material body 102. Transducer 104D is a reciprocating pump. In the illustrated embodiment, reciprocating pump 104D includes an actuation member 116. In use, the outer surface of a rotor (not shown) rotating within the profiled helical bore 106 would periodically contact actuation member 116, which displaces a piston(s) or plunger(s) to facilitate pumping. Hydraulic power from reciprocating pump 104D can be used to power an actuator, for example.

FIG. 2 is a schematic cross-sectional view of a stator 200 having a cast material body 202 with housings (218,222) disposed therein and a cavity 226 formed therein, according to one embodiment of the invention. The embodiment in FIG. 2 includes a sleeve 208, which can be a resilient material (e.g., elastomer), and outer tube 210, which are each optional. A housing can be atmospherically sealed or pressure compensated, as is known in the art. A housing (218,222) can be any shape and is not limited to the rectangular forms depicted in FIG. 2. Housing 218 can include a port 220 (shown with a dotted line) through the cast material body 202 into the profiled helical bore 206 and/or to an exterior surface of the cast material body 202 or stator 200. Housing 222 is illustrated with ports through the cast material body 202 into the profiled helical bore 206 and/or to an exterior surface of the stator 200 (e.g., for a pressure compensated housing). Housing (218, 222) can be formed from any material, for example, a polymer or metal. Transducer (not shown) can be disposed within a housing (218,222) before insertion of the housing (218,222) into the cast material body 202. In one embodiment, a housing (218,222) is disposed into fluid cast material before the cast material is cured (e.g., solidified). If access to a housing (218,222) and/or transducer is desired, an access panel 224 can be included in the outer tube 210 and/or profiled helical bore 206 (not shown). Access panel 224 can be any shape and can be attached to the stator 200 by any means, for example, weld, bolt, screw, adhesive, etc. In an embodiment without an outer tube 210, housing 222 can include an access panel (not shown) to seal and/or to cover access port to housing 222 (or a void) from an exterior surface. It is appreciated that an access panel (not shown) could be utilized to seal and/or to cover an access port to housing 222 (or a cavity 226) from the profiled helical bore 206.

Stator 200 in FIG. 2 further depicts a cavity 226 in communication with and coterminous with the profiled helical bore in the cast material body 202. Similarly, cavity 226 can extend through optional sleeve 108, e.g., coterminous with the profiled helical bore 206 in sleeve 108. Transducer can mount directly in cavity 226. Cavity 226 can be formed as a mirror image of at least part of a transducer, e.g., to removably receive a transducer. This can also serve to at least partially retain a transducer to the cast material body 202. Cavity 226 in cast material body 202 can include mounting hardware to attach a transducer. Mounting hardware can be disposed in fluidic cast material and the curing (e.g., solidifying) of the cast material can bond the mounting hardware to the cast material body 202. For example, a portion of the mounting hardware would extend within the cast material body 202 to form a mechanical attachment to the cast material body 202. A cavity mold, as is known the art, can be used to form a cavity 226. Cavity mold can be removed from the cast material body 202 or can remain attached to the cast material body 202, e.g., when stator 200 is in use as a progressive cavity apparatus. Cavity mold can be coated with a release agent or made of non-stick material, for example, polytetrafluoroethylene, to aid in the removal from cast material body (e.g., solidified cast material). Although not shown, cavity 226 can extend to the exterior surface of the cast material body 202 from the profiled helical bore 206.

Figure 3:
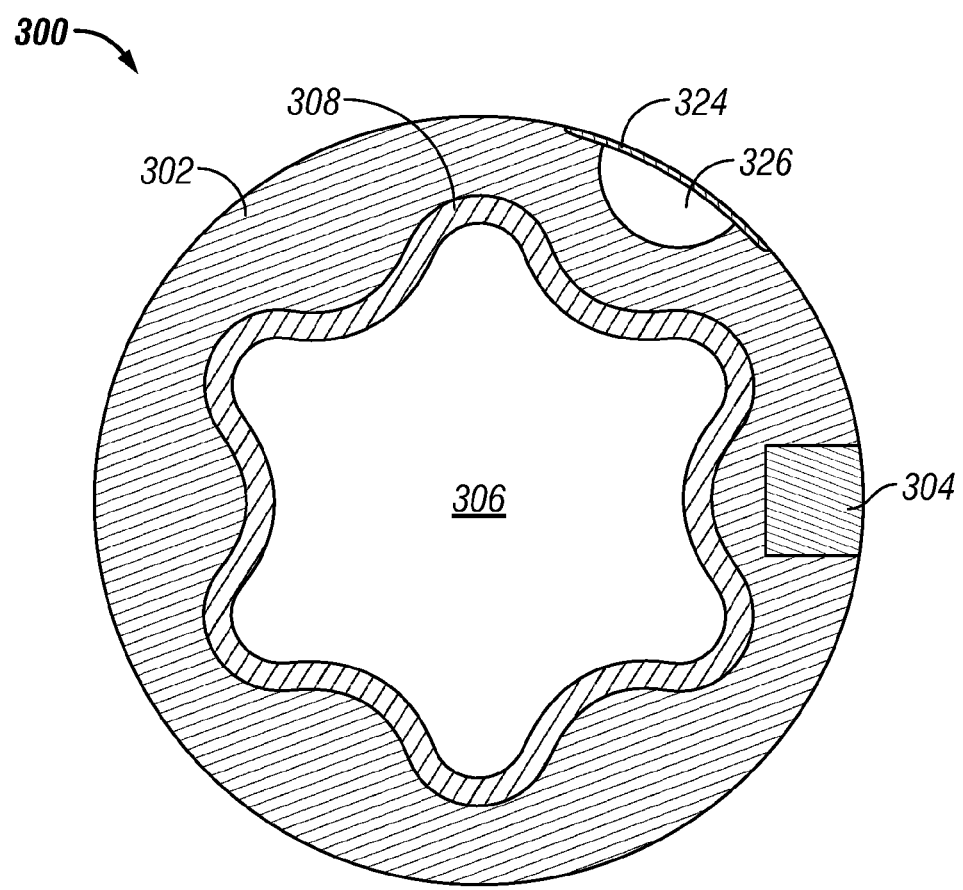
FIG. 3 is a schematic cross-sectional view of a stator having a cast material body and a transducer disposed therein, according to one embodiment of the invention.

FIG. 3 is a schematic cross-sectional view of a stator 300 having a cast material body 302 and a transducer 304 disposed therein, according to one embodiment of the invention. Stator 300 does not include optional tube circumferential to the cast material body 302. Transducer 304 is disposed adjacent an exterior surface of the cast material body 302, which is the exterior surface of the stator 300. Transducer 304 is coterminous with exterior surface of the cast material body 302 in FIG. 3. Transducer 304 can be adjacent exterior surface of the cast material body 302 in FIG. 3, but totally encapsulated within cast material body 302. Stator 300 includes an optional internal sleeve 308. Stator 300 also includes a cavity 326. Cavity 326 can be formed as discussed above in reference to FIG. 2. Optional access panel 324 can be included to seal and/or to cover opening of cavity 326 on exterior surface of the stator 300. Cast material body 302 can include a housing disposed therein without departing from the spirit of the invention.

Figure 4A:
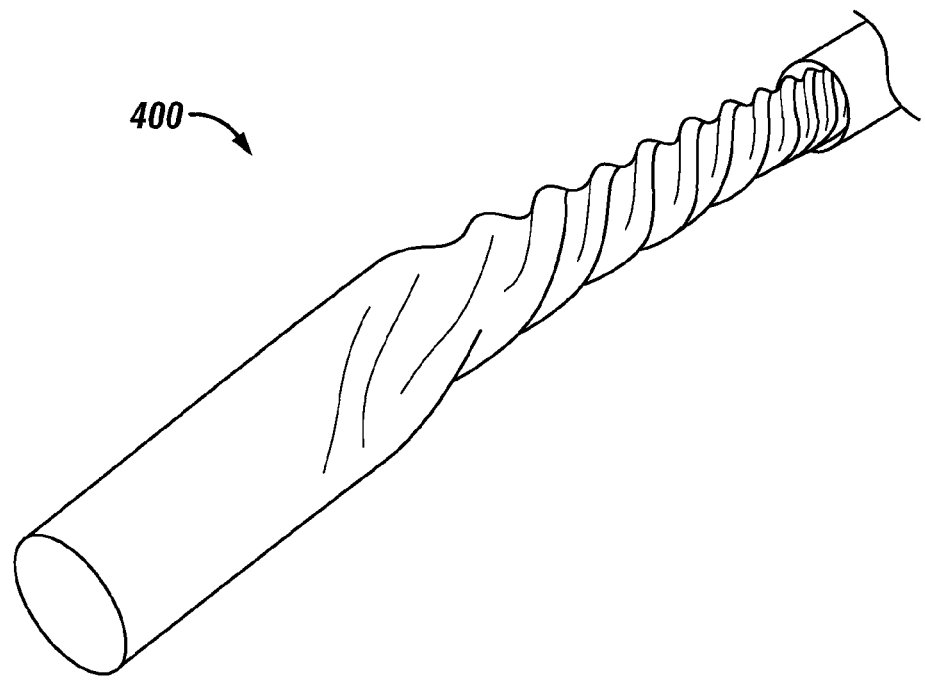
FIG. 4A is a perspective view of a profiled helical tube, according to one embodiment of the invention.
Figure 4B:
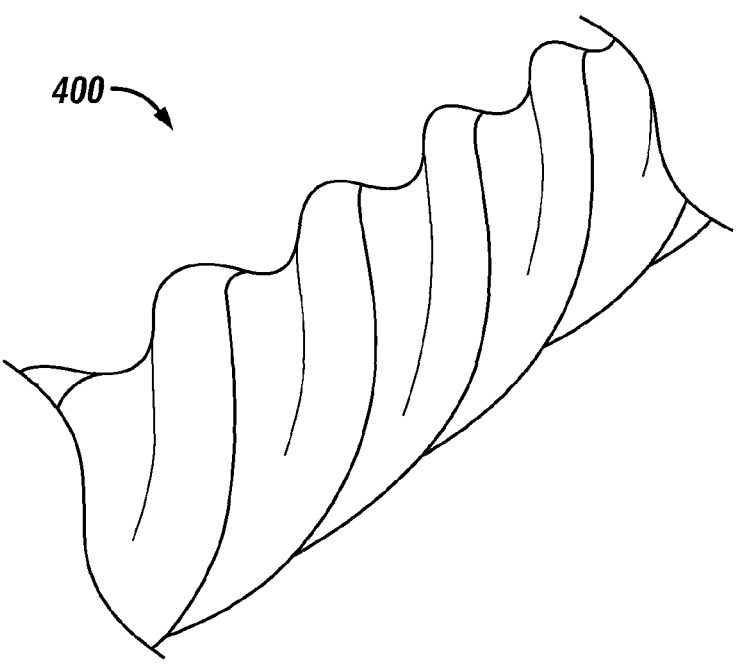
FIG. 4B is a close-up perspective view of the profiled helical tube of FIG. 4A.
Figure 5:
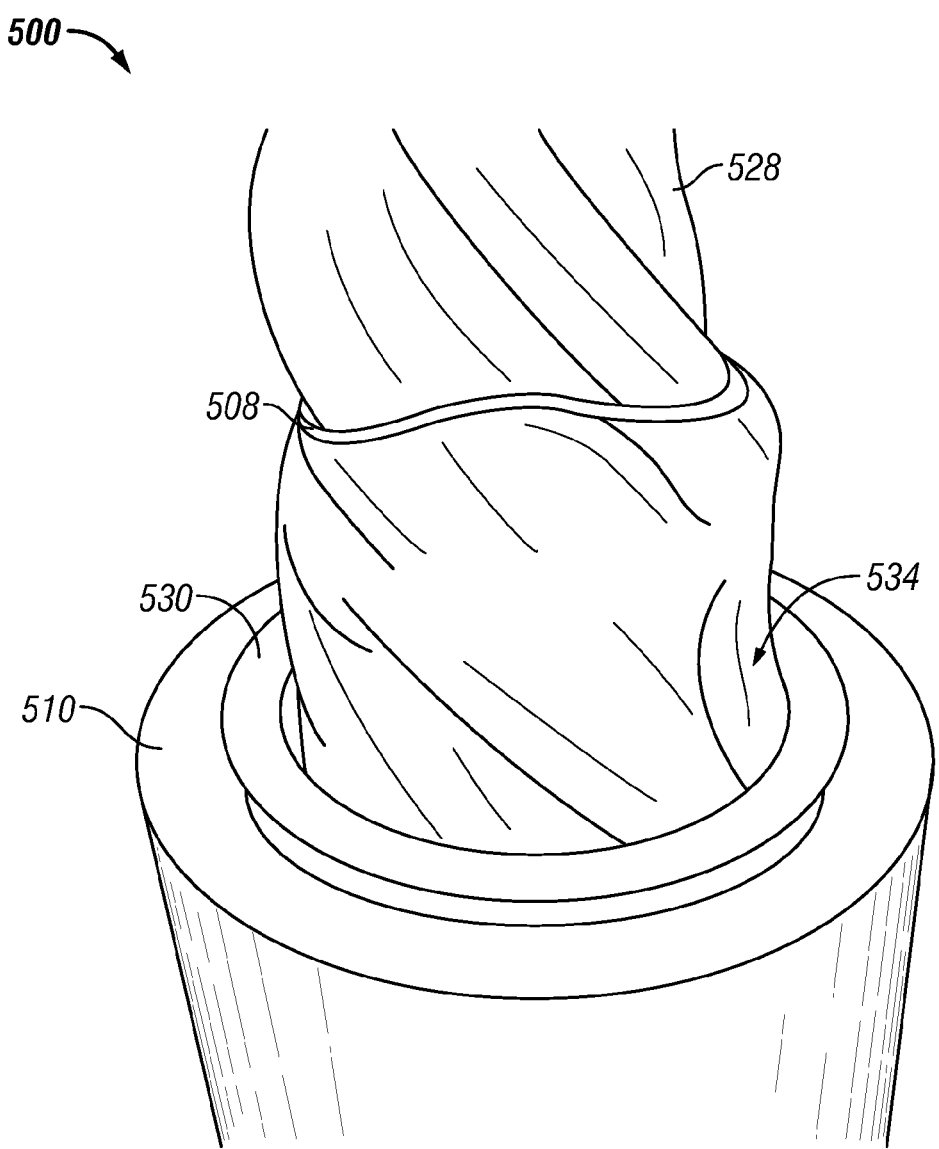
FIG. 5 is a perspective view of a resilient material sleeve disposed on a core with a profiled helical outer surface and within a longitudinal bore of a body to form a resilient material lined stator, according to one embodiment of the invention.

Referring now to FIGS. 4A-5, one method of forming a stator is described. FIG. 4A is a perspective view of a profiled helical tube 400, according to one embodiment of the invention. Profiled helical tube can be used as a sleeve, for example. FIG. 4B is a close-up perspective view of the profiled helical tube 400 of FIG. 4A more readily illustrating the lobes and valleys of the profiled helical form. FIG. 5 is a perspective view of a resilient material sleeve 508 (e.g., sleeve 400 from FIGS. 4A-4B) disposed on a core with a profiled helical outer surface and within a longitudinal bore of a body 510 to form a resilient material lined stator 500, according to one embodiment of the invention. As used herein, the term resilient shall refer to any material capable of substantially returning to an original shape or position, as after having been compressed, for example, an elastomer, rubber (e.g., nitrile or silicone), propylene, fluorocarbon, urethane, or polyurethane. A resilient material can have a hardness of less than about 90 durometer or a hardness in the Shore A scale. Alternatively, the resilient material can be composed of a polymer having a glass transition temperature approximating the expected operating temperature of the progressive cavity motor to permit the polymer to retain its hardness until deployed in the well bore where such temperature would be found. The resiliency of the polymer above such temperature would be sufficient to permit the motor to operate efficiently, all as more fully described in SLB Ser. No. 92.1174, filed of even date herewith, and incorporated herein by reference.

Body 510 can, at least partially, provide mechanical support to a cast material body during use as a progressive cavity apparatus. The curing process can bond a cast material body (e.g., cast material layer) to body 510. Alternatively, a cast body can be formed on an exterior mold (not shown), then, after curing of cast material, bonded to body 510 to form stator, as shown in FIG. 3. Body 510 can be a tube (e.g., 110 in FIGS. 1 and 210 in FIG. 2), more specifically, a metal tube.

In one embodiment of making a stator, a sleeve 508 with a profiled helical bore is provided. Sleeve 508 can retain a profiled helical form without external support or the curing of the fluidic cast material around the sleeve can retain the profiled helical form, as is describer further below via the use a support core 528 during curing and/or disposition of the sleeve 508 into the body 510 (e.g., mold).

Tube 508 with a profiled helical bore can be formed by any means known in the art. The profiled helical inner surface is provided by the tube 508, and thus in this embodiment a profiled helical inner surface does not have to be preformed in the stator body and then lined with elastomer as is typical in the prior art. For example, if a resilient material sleeve 508 is formed by disposing a cylindrical semi-cured resilient material tube onto core 528, the core 528 preferably remains within the resilient material tube at least until the cast material is sufficiently cured to retain the profiled helical shape due to the resiliency of the semi-cured resilient material to a cylindrical, and thus a non profiled helical, form. More succinctly, the core 528 would initially shape the sleeve 508. Furthermore, in forming an elastomeric layer by injection as in the prior art, the elastomeric layer is essentially the last component formed. The current invention allows the resilient material layer 508 to be one of the first components formed in the creation of a resilient material lined stator.

After formation, the tube (e.g. sleeve) 508 is then disposed within a longitudinal bore of a body 510, depicted as a tube. Body 510 can be a simple cylindrical tube as shown in the figures, or any other shape or style of inner or outer diameter and is not limited to a tubular form. Body 510 can have a profiled helical inner and/or profiled helical outer surface or any type of complex inner geometry if so desired. The inner and outer diameter or profile of the longitudinal bore of the body 510 and the inner and outer diameter or profile of the sleeve 508 can independently be any size or shape provided the sleeve 508 can be disposed inside the body 510.

When the body 510 and the sleeve 508 are in a desired position in this embodiment, fluidic cast material is then disposed in the void 534 formed between the outer surface of the sleeve 508, which is not required to be a profiled helical outer surface as shown, and the longitudinal bore of the body 510. In one embodiment, cast material is in a fluid state when disposed in the void 534 and can be later cured with heat, pressure, the passage of time, etc. To keep the fluidic or otherwise non-fully cured cast material within the longitudinal bore of the body 510, one can seal at least a distal end of the void 534 between the outer surface of the sleeve 508 and the longitudinal bore of the body 510.

Cast material can conform to any shape exterior of the sleeve 508 to fill the entire void. Cast material can be any material suitable for use with a progressive cavity apparatus. Metal fillers or other heat conducting materials can be added if desired to conduct heat generated in the stator bore to the outer surface of the stator tube to aid in cooling.

Cast material can be curable by thermosetting, for example. Multiple concentric layers of differing or similar cast materials can be utilized. The cast material can be selected based on the fluid, which can include other particulate matter, for example, drill bit cuttings, used to power or is pumped by a progressive cavity apparatus. Cast material can be selected based on any temperature exposure requirements, for example, the downhole fluid temperature.

If further adhesion between the sleeve 508 and cast material is desired, a bonding agent, for example, a primer, can be applied to the exterior surface of the sleeve 508 prior to insertion into the longitudinal bore of the body 510. If further adhesion between the body 510 and the cast material is desired, surface roughing or a bonding agent, for example a primer, can be applied to the interior surface of the body 510 prior to the insertion therein of the sleeve 508. At least one groove (not shown) can be machined into the interior surface of the longitudinal bore of the body 510 to provide a mechanical lock between the body 510 and the cast material. If removal of the body 510 is desired, the bore of the body 510 can be coated with a release agent or made of non-stick material, for example, polytetrafluoroethylene, to aid in the removal.

As discussed in the prior art and especially U.S. Patent and Trademark Ser. No. 11/496,562, incorporated by reference herein, a conduit, conductor, and/or pathway can be cast into the void between the body 510 and the sleeve 508 (e.g., in one embodiment, a resilient material tube). Conduit, conductor, and/or pathway in cast material body can connect to a transducer disposed in cast material body. Conduit, and/or conductor can be external to cast material body layer. Sleeve 508 can be an at least partially uncured material. At least partially uncured sleeve 508 can be cured concomitantly with the cast material. End ring 530 can be disposed at the proximal end of the longitudinal bore of the body 510 to center the sleeve 508 and/or core 528 within the longitudinal bore.

In another embodiment, sleeve 508 is design selected to retain a profiled helical form and/or resist deformation when cast material is disposed in void 534. In such an embodiment, use of core 528 during formation of the stator 500 is optional.

It is also appreciated that a core 528 can be utilized without a sleeve 508. In one embodiment, core 528 is displaced into the bore of body 510 and fluidic cast material is added to the void 534 between body 510 and core 528. When cast material is sufficiently cured, the 528 core is removed, e.g., akin to threading a bolt out of a nut, to expose a profiled helical bore formed directly in the cast material. If removal of the core 528 is desired, the profiled helical outer surface thereof can be coated with a release agent or made of non-stick material, for example, polytetrafluoroethylene. Core 528 can be a frangible or disposable material which can be broken, melted, chemically dissolved, etc. to remove from profiled helical bore imparted in cast material. Such a stator can be utilized as is or lined, e.g., by elastomer injection as is typical in the art. If desired, forming of a stator can include removing the body 510 from the cast material, e.g., stator 300 in FIG. 3.

Figure 6:
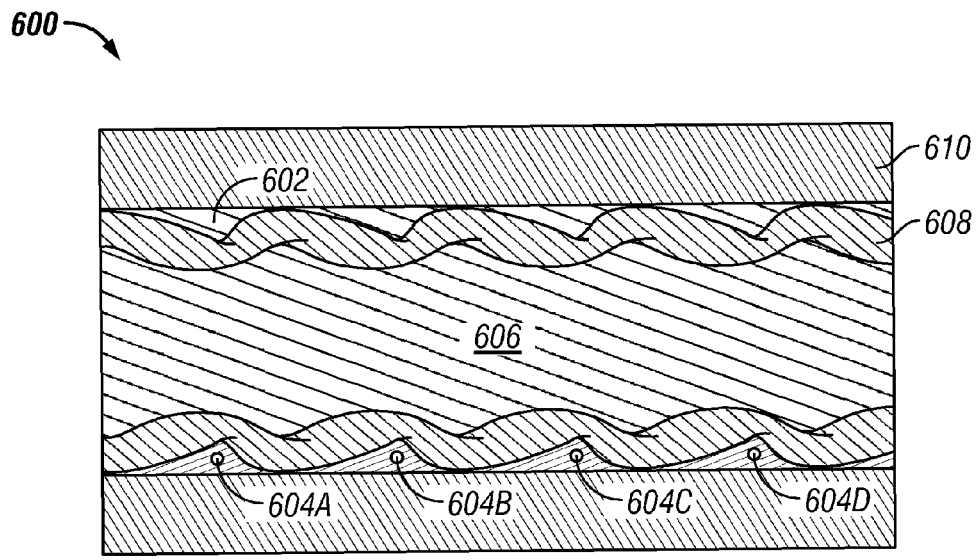
FIG. 6 is a longitudinal cross-sectional view of a stator having a cast material body with transducers disposed therein, according to one embodiment of the invention.

FIG. 6 is a longitudinal cross-sectional view of a stator 600 having a cast material body 602 with transducers 604A-604D disposed therein, according to one embodiment of the invention. Transducers 604A-604D can be distributed along an axial length of the stator 600 and/or circumferential to a longitudinal axis of a stator. Transducers 604A-604D can be distributed at a constant or variable interval along a stator.

Figure 7:
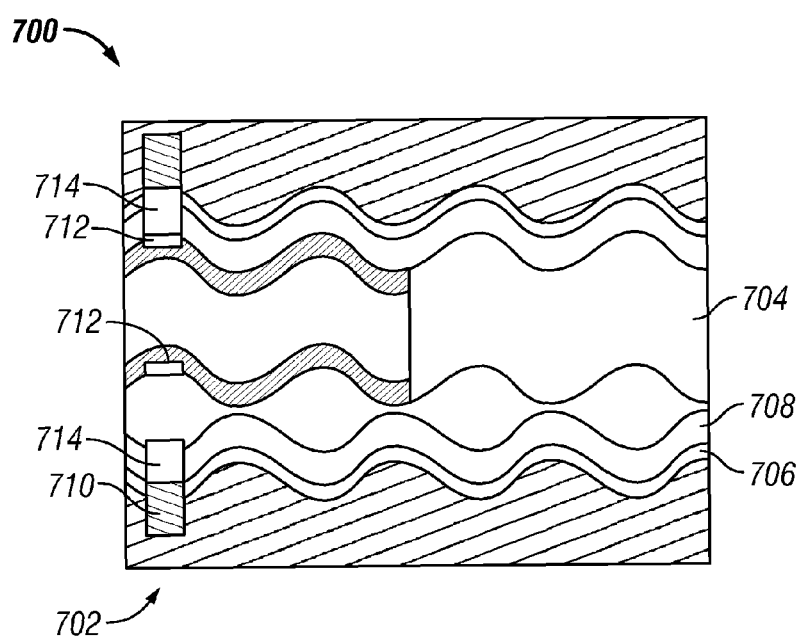
FIG. 7 is a longitudinal cross-sectional view of a progressive cavity apparatus electrical having a conducting section, according to one embodiment of the invention.

FIG. 7 is a longitudinal cross-sectional view of a progressive cavity apparatus 700 having an electrical conducting section 702, according to one embodiment of the invention. Progressive cavity apparatus 700 includes a rotor 704 with a profiled helical outer surface disposed in the profiled helical bore of a stator 706, with a sleeve 708 disposed therebetween. In one embodiment, the sleeve 708 is a resilient material. The illustrated embodiment depicts the sleeve 708 abutting the profiled helical bore of the stator 706. Sleeve 708 can abut the profiled helical outer surface of the rotor 704 without departing from the sprit of the invention. Stator 706 can have a cast material body.

In one embodiment, electrical conducting section 702 includes an electrical conductor ring 710 in a cast material body of the stator 706, rotor 704 having an outer surface with a second electrical conductor ring 712 circumferential thereto, and an intermediate ring section 714 of the sleeve 708 comprising a conductive material therein to communicate between the first 710 and the second 712 electrical conductor rings. Sleeve 708 can be resilient material and include conductive material therein, for example, carbon. In one embodiment, carbon particles are encapsulated within sleeve 708, which can be a non-conductive material. Electrical conductor ring 710 can be disposed into the cast material body of the stator 706 when the cast material is in a fluid state. Electrical conductor ring 710 can be circumferential to bore of the stator 706. Conductor or other transmittal means can provide power to and/or from each conductor ring (710,712).

In another embodiment, element 710 can be one of a magnet and a coil of a power generating apparatus and element 712 can be the other. Relative rotation therebetween can generate electricity. In this embodiment, it can be desirable to ensure suitable resistivity characteristics of cast material. Progressive cavity apparatus 700 can include an intermediate ring section 714.

Figure 8:
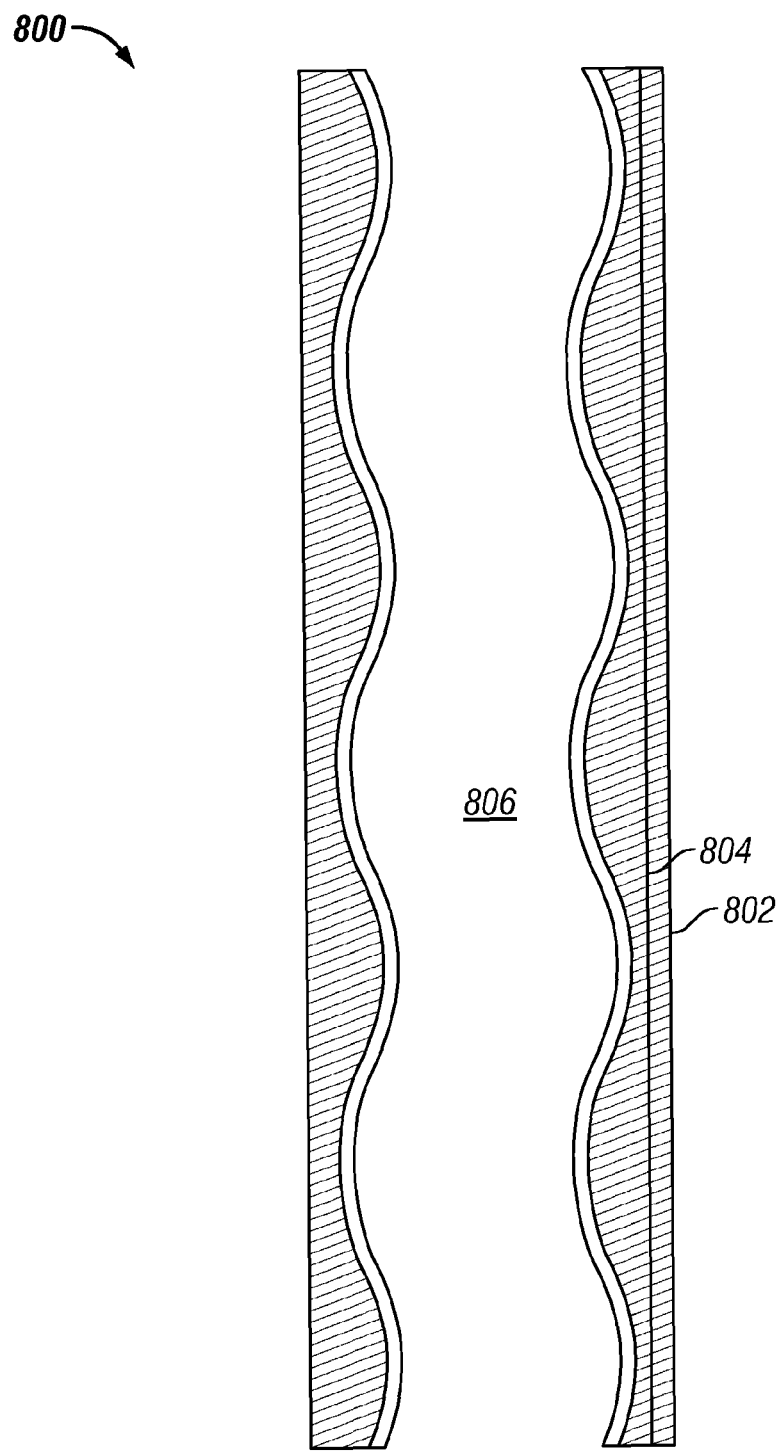
FIG. 8 is a schematic longitudinal cross-sectional view of a stator having a cast material body and a transducer disposed therein, according to one embodiment of the invention.

FIG. 8 is a schematic longitudinal cross-sectional view of a stator 800 having a cast material body 802 and a transducer 804 disposed therein, according to one embodiment of the invention. Transducer 804 extends along an axial length of the bore 806. Transducer 804 can be a wire strain sensor or at least one optical fiber, for example. Transducer 804 can extend in a helical path along the bore 806.

A few non-limiting examples of using a cast material body stator with at least one transducer disposed therein will now be described. Transducers include both sensors and actuators. In one embodiment, a sensor disposed within a cast material body can monitor or check the health of a stator. This can be done during stator use (e.g., use as a mud motor) or during a maintenance period.

A stator having a cast material body with at least one transducer disposed therein can allow the following uses, for example. At least one transducer can be a temperature, pressure, strain, load, etc. sensor utilized during the formation of a stator. A signal from a temperature, pressure, strain, load etc. sensor of stator can be utilized to monitor the curing of the cast material. Monitoring can be in real time or a data log. In one embodiment, heat is applied to the cast material to cure. Signal from a temperature sensor in the cast material can indicate the state of cure. A single sensor or multiple sensors can be utilized. Curing can be controlled via the signal. For example, regulating the heat applied to the cast material to generate a desired temperature (or temperature distribution) in the cast material and/or regulating the pressure applied to the cast material to generate a desired pressure (or pressure distribution) in the cast material.

A sensor in the cast material can be utilized to detect any discontinuity in the stator. For example, a stator can be heated to a desired temperature and a signal returned from at least one temperature sensor in the cast material. Signal can be compared to temperature signals from other temperature sensors disposed in the cast material or a prototypic signal. A prototypic signal can be the signal expected when no discontinuity is present. For example, one can monitor the heat transfer through the cast material via temperature sensor(s) and this can be compared to a known model, i.e., any imperfections or voids will disrupt the measurements.

A sensor in the cast material can be utilized to cast or assemble a stator and/or to monitor or assemble a rotor and a stator to form a progressive cavity apparatus. A strain, pressure, load, and/or temperature signal can be provided from respective sensor(s) disposed in the cast material body. Strain, pressure, load, and/or temperature signal provided during the insertion of a rotor into the profiled helical bore of a stator can be compared to a prototypic signal to determine any undesirable fit therebetween.

Similarly, strain, pressure, load, and/or temperature signal provided during the rotation of a rotor into the profiled helical bore of a stator (e.g., during use as a progressive cavity apparatus) can be compared to a prototypic signal to determine any deviation therebetween. Deviation of signal and a prototypic signal can correspond to an undesirable fit due to wear, improper parts, etc. and/or correspond to any damage to the progressive cavity apparatus, e.g., damage to a resilient material sleeve between a rotor and stator. A prototypic signal can be a first signal, which can then be compared to a subsequent second signal to ascertain any deviation therebetween. The previous methods can be used in a positive interference fit stator, as is know in the art, e.g., the resilient material sleeve is at least partially compressed during rotation of the rotor within the profiled helical bore of the stator.

A plurality of pressure sensors can be distributed along, and in communication with, a profiled helical bore. In one embodiment, the pressure sensors are distributed along a single pitch length, e.g., along a helical path traced by one lobe, as shown schematically with reference characters 904A-904C in FIG. 9. Pressure sensor would be used to check the pressure integrity of a cavity within the assembled motor. A cavity is a void between the rotor and stator. There is a closed cavity at each pitch distance and this cavity (i.e., void) travels along the progressive cavity apparatus to effectively carry a slug of fluid. Stator can have one sensor every pitch distance, for example, pressure sensors to provide the pressure distribution along the progressive cavity apparatus, i.e., to check the leakage and/or fit between rotor and stator.

Additionally or alternatively, pressure, load, torsion, etc., sensors can be used to check fit and/or performance both during manufacture and operation as a progressive cavity apparatus (e.g., down hole). A signal corresponding to the pressure, load, and/or torsion along the stator can allow an assessment of power output as a progressive cavity motor, for example. A cavity is the space between the rotor and stator and there is a closed cavity at each pitch distance. This cavity/void travels along the profiled helical bore of a stator, effectively carrying a slug of fluid, but the sensors are fixed in the stator. In calculating the performance of the motor, pressure measurements from sensors (e.g., 904A-904C) take measurements at each pitch distance and from knowledge of the motor geometry you can calculate the torque contribution of each pressurized cavity.

If sensors are distributed along the stator, it can allow determination where a problem is occurring, i.e., which cavity pitch. In one embodiment, a strain gauge (e.g., 804 in FIG. 8) can measure the reactive torque on the stator 800 from a pressurized cavity. Similarly, if there is a leak from one cavity (i.e., void) to another this will show up in the torque measurements from the strain gauge 804 and/or the pressure measurements from any pressure sensors (e.g., sensors 904A-904C in FIG. 9) in communication with the profiled helical bore. The cause of a leak between cavities could be wear or damage to either the stator (e.g., the resilient material liner) or rotor. This information can be combined with a flow rate into the stator 800 and the rate of revolution (e.g., RPM) between the rotor and stator (e.g., detected from periodic sensor readings) to determine power efficiency.

Referring again to FIGS. 1-9, methods of use will be described, but should not be limited to the depicted embodiments. In one embodiment, a prototypic signal of a sensor (e.g., 104A-104C in FIG. 1) can be provided. For example, stator bore 106 can be pressurized to a chosen pressure and the signal from the sensor(s) at the chosen pressure can be the prototypic pressure signal. Additionally or alternatively, stator bore 106 can be heated to a chosen temperature and the signal from the sensor(s) at the chosen temperature can be the prototypic temperature signal. An actual pressure and/or temperature of the stator 100 from the sensor(s) (e.g., 104A-104C) when exposed to the chosen pressure and/or temperature, respectively, can be compared to the prototypic signals. Any deviation therebetween can indicate a discontinuity of the stator 100, e.g., discontinuity of the cast material 102 and/or resilient material 108.

Figure 9:
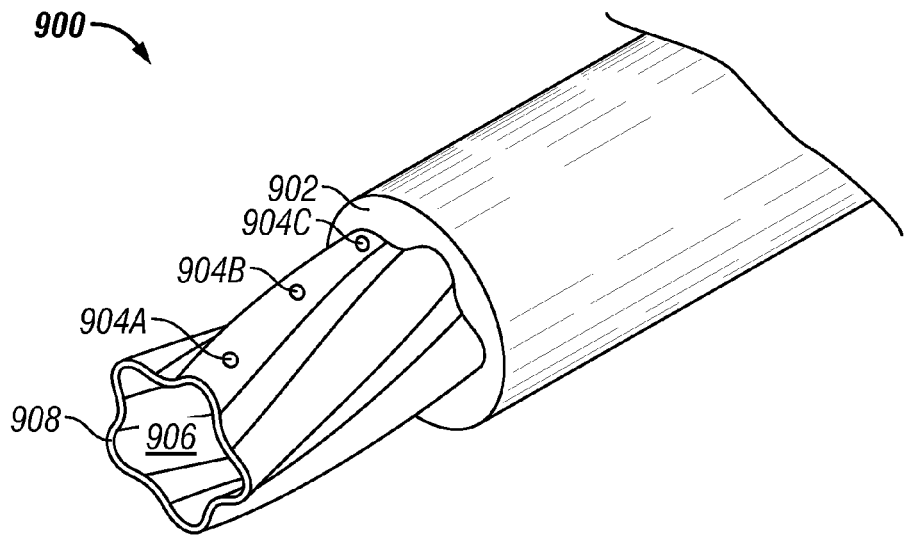
FIG. 9 is cutaway perspective view of a stator having a cast material body with transducers disposed therein, according to one embodiment of the invention.

A plurality of sensors can be distributed along the stator, e.g., sensors 904A-904C depicted schematically in FIG. 9. A signal from a first sensor can be compared to a signal from another sensor(s) to determine any deviation therebetween. Deviation can indicate failure of the stator (e.g., a crack therein, resilient material layer/seal failure detection, wear of rotor/stator) and/or presence of a slug of fluid in the embodiment of a pressure sensor. Comparing concurrent signals can allow monitoring along a desired length of a stator. For example is pressure and/or strain sensors are embedded in the cast material layer, the signal(s) therefrom can be utilized to indicate the torque and/or power characteristic of the motor as described herein.

A method of assembling a rotor and a stator of a progressive cavity apparatus can include providing a prototypic signal generated when a rotor is inserted correctly (e.g., proper tolerances) into the profiled helical bore of a stator. Prototypic sensor signal can be for a pressure, strain, temperature signal, etc. An actual signal from a sensor during and/or after assembly can be compares to a prototypic signal, with a variance corresponding to undesirable fit.

Similarly, a pressure, strain, temperature sensor, etc. can be utilized to monitor a progressive cavity apparatus or a stator thereof. In one embodiment, a prototypic signal of a sensor (e.g., 104A-104C) corresponding to a desired fit can be generated, for example when the progressive cavity apparatus is functioning correctly. Thus during use as a progressive cavity apparatus, the condition of the stator 100, which can include a resilient material layer 108, can be ascertained via the sensor(s). For example, a first signal from a sensor can be compared to a second subsequent signal from a sensor, and any change can indicate an undesired fit and/or failure of the stator. One of ordinary skill in the art will appreciate that the degree of change corresponding to an undesired fit and/or failure of the stator can be determined, i.e., relatively small deviations in signals are not necessarily indicative of undesired fit and/or failure of the stator. The embodiments of this invention can be used to create a real time monitoring system.

The embodiments of this invention can be used to create an Outgoing Service Test (OST). There a signal from sensor(s) of the new progressive cavity apparatus (e.g., mud motor) is taken and compared subsequently for degradation after use. If a mud motor is having problems, the heat generated can be an indication of an impending fault, e.g., as an engine monitor. The power output of a progressive cavity apparatus also gives rise to heat generation, i.e., a characteristic finger print. This temperature profile can be ascertained and later compared to a signal from a temperature sensor(s) to determine any fault and/or to approximate the power output of the progressive cavity apparatus.

Sensor can be an axial load sensor, which can indicate the load on stator. Stator load can correspond to the weight on bit when the progressive cavity apparatus is a mud motor attached to a drill bit.

Sensor can be an accelerometer, shock sensor, magnetometer, etc. to measure the motion of the stator and/or rotor for drilling mechanics and bottom hole assembly (BHA) motion monitoring.

Formation sensors, sonic sensors, etc. can be disposed into the cast material, e.g., sensor 304 in FIG. 3. These can be used for resistivity, seismic evaluation, or other logging measurements. Embedded sensor technology in a stator can be used for measurement and/or logging while drilling.

Figure 11:
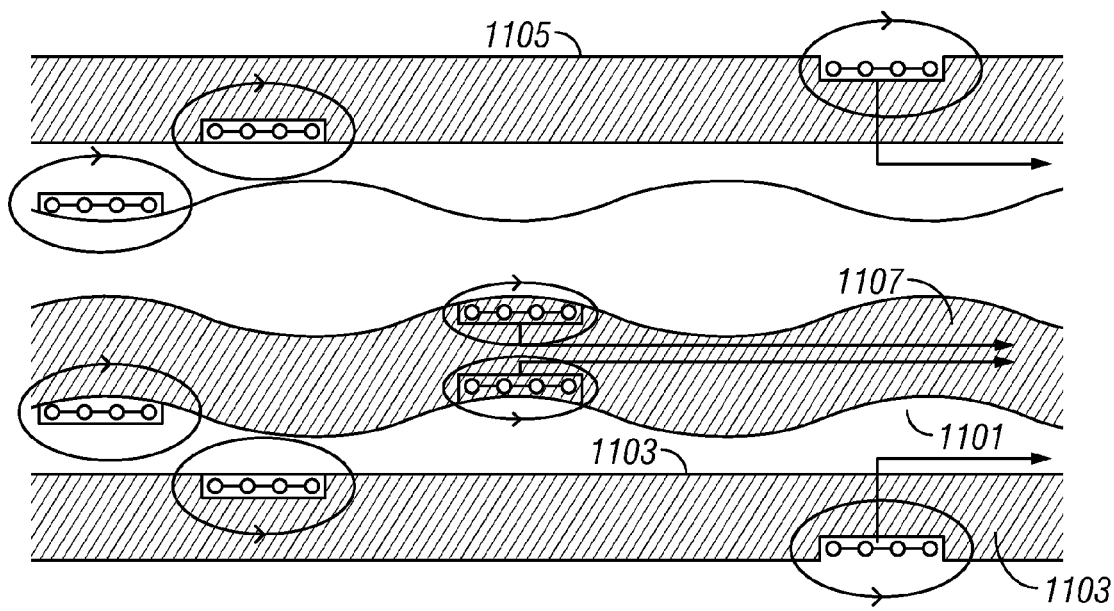
FIG. 11 is a schematic view of the mounting of electromagnetic coils at various locations in either a stator or a rotor.
Figure 11A:
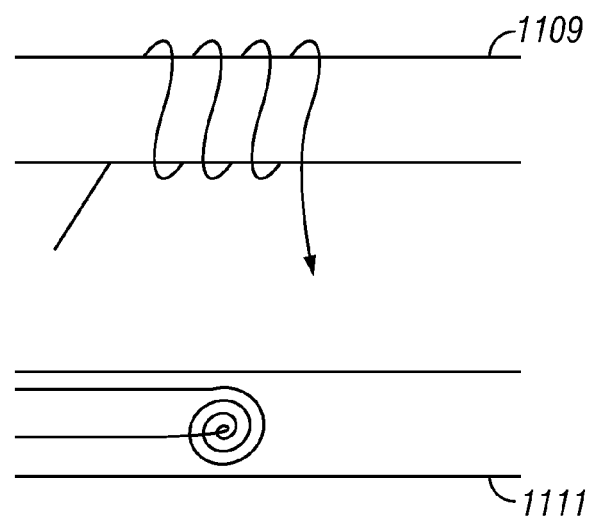
FIG. 11A is a schematic view of the two alternative mounting techniques which may be employed to mount electromagnetic coils on either a rotor or a stator.

Electromagnetic induction coils can be disposed in cast material (e.g., 804 in FIG. 8) to transmit information (active or passively) across the stator. As more fully shown in FIG. 11, electromagnetic coils can be disposed in the elastomeric cast materials 1101, in the interior surface of the stator tub body 1103, or on the exterior surface of the stator body 1105. These coils can be cooperatively mounted to communicate with coils mounted on a rotor of the progressive cavity motor 1107 as needed for sensing. Field lines drawn are illustrative only and not intended to limit the scope or direction of the electromagnetic field, generated or sensed by any of these coils. As more fully shown in FIG. 11A, the coils can be circumferential to the longitudinal axis of the stator body 1109 or mounted in a tangential plane to the longitudinal axis of the stator body 1111, whether mounted on an interior surface of the stator or an exterior surface of the stator for the purposes required. Any number of these types of coils may be combined in one stator body to accomplish a number of useful sensing and control functions, all in a manner well known to those in this art. The usefulness of the progressive cavity pump is expanded by using the stator body itself as a support for the electromagnetic coils used by these sensors.

Load sensors can be disposed in cast material to detect torque and/or weight on bit. In one embodiment, wire strain sensor (e.g., 804 in FIG. 8) can be encapsulated in cast material. When distributed along a length of a stator, the small changes in resistivity of the wire strain sensor can be ascertained. These changes in resistivity can be compared to a prototypic change in resistivity to indicate an axial deflection (e.g., weight on bit) and/or a radial deflection (e.g., torque) Changes in resistance can also be used to detect overall temperature changes along the motor. By disposing sensors along the stator body in the cast materials, vital temperature data can be collected and processed thereby forewarning of imminent failure of the progressive cavity motor, and other operational problems associated with increased motor temperature.

Optical fiber can be disposed in cast material (e.g., 804 in FIG. 8). Light can be transmitted through the optical fiber. Backscatter of light can indicate a deflection of optical fiber, and thus a strain or deflection of the cast material in which the optical fiber is disposed. This deflection can indicate an axial deflection (e.g., weight on bit) and/or a radial deflection (e.g., torque). The high noiseless bandwidth associated with the disposition of optical fiber in the cast material can be permit miniature cameras to examine pump internals as well as well conditions in real time in both the visible and infrared spectrum. Although available in wired systems, the electronic noise associated with such technology makes optical viewing difficult.

Figure 10:
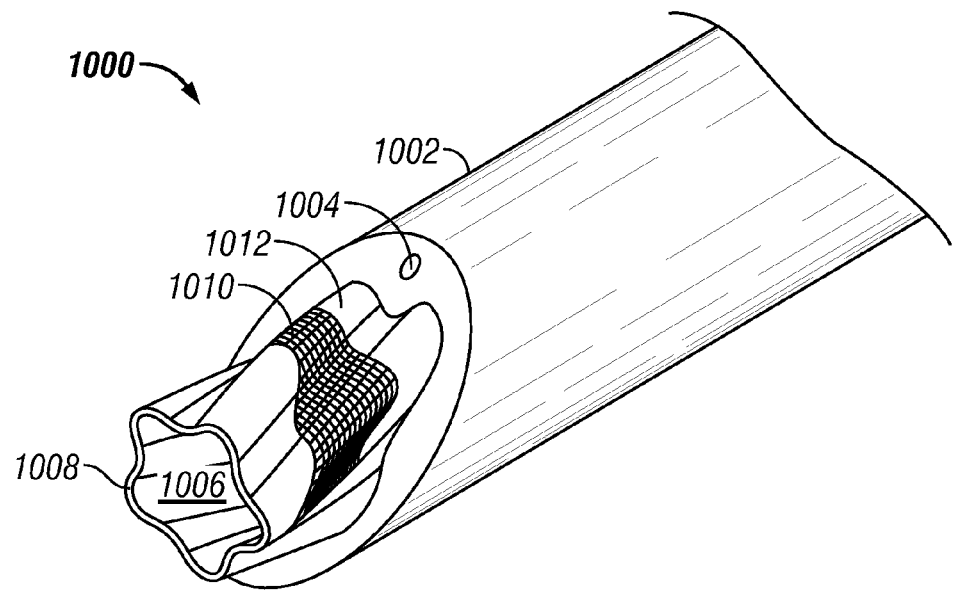
FIG. 10 is a cutaway perspective view of a stator having a sleeve with transducers disposed therein, according to one embodiment of the invention.

Everything disclosed above is equally applicable to the sleeve (e.g., resilient material sleeve 108 in FIG. 1). FIG. 10 is a cutaway perspective view of a stator 1000 having sleeve 1008 with transducers 1010 disposed therein, according to one embodiment of the invention. In one embodiment, sleeve 1008 is a resilient material. Stator 1000 includes cast material body 102, which can be surrounded by a body (not shown) as discussed above. Profiled helical bore 1006 extends through sleeve 1008. Portion of cast material body 1002 is shown removed for illustrative purposes. Cast material body can optionally include a transducer 1004 disposed therein. Portion of sleeve 1008 is depicted as removed to more readily show transducer 1010. Transducer 1010 can be encapsulated within the sleeve 1008 (as shown) or disposed partially therein sleeve 1008. Sensors, electronics and/or wires can be disposed (or encapsulated) into a resilient material sleeve, like a deformable or flexible circuit board, during its manufacture. Sensors 1010 disposed in the sleeve 1008 can allow for monitoring of the continuity and/or thickness remotely.

Sensor 1010 is illustrated as a mesh. Any discontinuity in the mesh 1010 can indicate a crack or other defect in the sleeve 1008 (e.g., resilient material layer). Wire(s) 1012 can extend from sleeve 1008 into and/or through the cast material 1002. Sleeve 1008 can be cured before, during, and/or after curing of cast material. In one embodiment, at least the inner surface of the sleeve 1008 is resilient. Forming a resilient material sleeve 1008 can include providing a sleeve mold, filling the sleeve mold with a resilient material in a fluid state, disposing at least one transducer at least partially into the resilient material, and curing the resilient material to form the resilient material sleeve with at least one transducer disposed therein. Sleeve mold can form a tubular sleeve or a profiled helical sleeve, thus permitting embedded electronics based on flexible circuit board technology to be implemented within this flexible member. This could enable this sleeve to monitor and record operational details of the progressive cavity pump and either transmit or save such data for subsequent download and examination.

Numerous embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What is claimed is:

1. A method of forming a stator with a profiled helical bore comprising:
providing a core with a profiled helical outer surface;
displacing the core within a longitudinal bore of a body;
filling a void between the profiled helical outer surface of the core and the longitudinal bore of the body with a cast material in a fluid state;
disposing at least one transducer in the cast material; and
curing the cast material.

2. The method of claim 1 wherein the disposing step occurs when the cast material is in the fluid state.

3. The method of claim 1 further comprising removing the core from the cured cast material.

4. The method of claim 1 wherein the core includes a resilient material sleeve disposed thereon.

5. The method of claim 4 further comprising removing the core from the resilient material sleeve, wherein the resilient material sleeve is retained within the cured cast material.

6. The method of claim 1 further comprising providing a signal from a temperature sensor in the cast material.

7. The method of claim 6 further comprising monitoring the curing step via the signal.

8. The method of claim 6 further comprising controlling the curing step based on the signal.

9. The method of claim 1 further comprising disposing a pressure compensated housing into the cast material before curing.

10. The method of claim 1 further comprising disposing an atmospherically sealed housing into the cast material before curing.

11. A method of monitoring a progressive cavity apparatus comprising a rotor disposed in a profiled helical bore of a stator, the method comprising:
providing a plurality of pressure sensors disposed in a cast material body of the stator and in communication with the profiled helical bore;
providing a first signal from one of the pressure sensors;
providing a second signal from another of the pressure sensors; and
comparing the first signal to the subsequent second signal to determine any deviation therebetween.

12. The method of claim 11 further comprising distributing the plurality of pressure sensors in a helical path along the profiled helical bore of the stator.

13. The method of claim 11 further comprising distributing the plurality of pressure sensors in a helical path along the profiled helical bore of the stator with at least one pressure sensor per pitch length.

* * * * *